(12) United States Patent
De Meerschman (10) Patent No.: US 10,844,948 B2
(45) Date of Patent: Nov. 24, 2020

(54) LUBRICATION DEVICE HAVING A PLURALITY OF LUBRICATION LIQUID RECOVERY TANKS, AND OPTIMIZED AND RELIABLE DELIVERY MEANS TO A MAIN TANK

(71) Applicant: AIRBUS HELICOPTERS, Marignane (FR)

(72) Inventor: Olivier De Meerschman, Lambesc (FR)

(73) Assignee: AIRBUS HELICOPTERS, Marignane (FR)

( * ) Notice: Subject to any disclaimer, the term of this patent is extended or adjusted under 35 U.S.C. 154(b) by 339 days.

(21) Appl. No.: 15/835,525

(22) Filed: Dec. 8, 2017

(65) Prior Publication Data

US 2019/0178366 A1 Jun. 13, 2019

(51) Int. Cl.
*F16H 57/04* (2010.01)
*B64C 27/12* (2006.01)
*F16H 57/02* (2012.01)

(52) U.S. Cl.
CPC ......... *F16H 57/0442* (2013.01); *B64C 27/12* (2013.01); *F16H 57/045* (2013.01); *F16H 57/0435* (2013.01); *F16H 57/0436* (2013.01); *F16H 2057/02043* (2013.01)

(58) Field of Classification Search
CPC ............. F16H 57/0435; F16H 57/0436; F16H 57/0441; F16H 57/0442; F16H 57/0445; F16H 57/045
See application file for complete search history.

(56) References Cited

U.S. PATENT DOCUMENTS

| | | |
|---|---|---|
| 3,275,061 A | 9/1966 | Williams et al. |
| 6,644,439 B2 | 11/2003 | Schnitzer |
| 6,691,830 B2 | 2/2004 | Blanc et al. |
| 6,817,448 B2 | 11/2004 | Maret et al. |
| 7,137,590 B2 | 11/2006 | Sandrart et al. |
| 8,381,878 B2 * | 2/2013 | DiBenedetto ........... F01D 25/18 184/6.11 |

(Continued)

FOREIGN PATENT DOCUMENTS

| | | |
|---|---|---|
| CN | 104670507 A | 6/2015 |
| CN | 105570441 A | 5/2016 |

(Continued)

OTHER PUBLICATIONS

French Search Report for French Application No. FR 1601333, Completed by the French Patent Office, dated May 22, 2017, 6 pages.

(Continued)

*Primary Examiner* — Minh Truong
(74) *Attorney, Agent, or Firm* — Brooks Kushman P.C.

(57) ABSTRACT

A lubrication device of a mechanical system, the lubrication device having a main tank, at least one recovery tank, a lubrication circuit, a flow generator supplying the lubrication circuit with a lubrication liquid located in the main tank and a delivery system for each recovery tank. Each delivery system has an ejector arranged in a recovery tank and first and second conduits linking the ejector firstly to the lubrication circuit and secondly to the main tank in order to deliver the lubrication liquid located in the recovery tank to the main tank using the ejector.

19 Claims, 4 Drawing Sheets

(56) References Cited

U.S. PATENT DOCUMENTS

| | | | |
|---|---|---|---|
| 8,893,469 B2* | 11/2014 | DiBenedetto | F01D 25/18 |
| | | | 60/204 |
| 9,677,707 B2* | 6/2017 | Pasquet | F16N 7/385 |
| 9,829,088 B2 | 11/2017 | Goujet | |
| 2011/0272239 A1* | 11/2011 | Yoshikawa | F16H 61/0021 |
| | | | 192/113.3 |
| 2014/0076661 A1 | 3/2014 | Xu | |
| 2015/0151845 A1 | 6/2015 | Jones | |
| 2016/0215652 A1* | 7/2016 | Mastro | F01D 25/20 |
| 2016/0341299 A1* | 11/2016 | Gerges | F16H 57/0412 |
| 2016/0376949 A1* | 12/2016 | Parnin | F01M 11/10 |
| | | | 73/112.01 |
| 2018/0106360 A1* | 4/2018 | Gmirya | F16H 57/0434 |

FOREIGN PATENT DOCUMENTS

| | | |
|---|---|---|
| DE | 4227119 A1 | 2/1994 |
| DE | 10051356 A1 | 4/2002 |
| DE | 10237417 A1 | 2/2004 |
| FR | 2814522 A1 | 3/2002 |
| FR | 2826094 A1 | 12/2002 |
| FR | 2831938 A1 | 5/2003 |
| JP | 2016133199 A | 7/2016 |

OTHER PUBLICATIONS

Notice of Preliminary Rejection for Korean Application No. 10-2017-0164089, dated Feb. 20, 2019, 3 Pages.

Chinese Office Action and Search Report, dated Mar. 2, 2020, Application No. 201711251052.6, Applicant Airbus Helicopters, (12 Pages).

\* cited by examiner

LUBRICATION DEVICE HAVING A PLURALITY OF LUBRICATION LIQUID RECOVERY TANKS, AND OPTIMIZED AND RELIABLE DELIVERY MEANS TO A MAIN TANK

BACKGROUND OF THE INVENTION (1) Field of the Invention

The present invention relates to the field of lubrication of power transmission systems, in particular power transmission systems designed for rotary-wing aircraft.

2) Description of Related Art

The present invention relates to a lubrication device having a plurality of lubrication liquid recovery tanks, as well as optimized and reliable delivery means to a main tank. This lubrication device is designed to lubricate a mechanical system and is particularly suited to lubrication of a power transmission system of a rotary-wing aircraft, hereinafter referred to as "transmission system".

Mechanical systems usually have rotary elements, such as shafts and bearings, and elements for transmitting power and reducing or increasing rotational speed, such as pinions and/or gears. To work correctly, mechanical systems require these elements to be lubricated and cooled, for example using a pressurized lubrication liquid such as oil. This lubrication is usually provided by a lubrication circuit, the main function of which is to limit the wear and overheating of these elements of the mechanical system, thereby prolonging the service life of the mechanical system. Without such lubrication, operation of the mechanical system may be quickly degraded or even become impossible.

Following this lubrication of the mechanical system, the oil flowing in the lubrication circuit may at times be very hot and therefore needs to be cooled in a cooling circuit, which is usually outside the mechanical system, before being usable again to lubricate the mechanical system. This cooling circuit for example includes a heat exchanger, for example an oil/air heat exchanger.

A lubrication circuit also includes a flow generator, such as a pump, to supply the lubrication circuit with the oil stored in a tank, thereby enabling same to flow in the lubrication circuit. This tank is usually used as a recovery tank, the oil recovered in this tank after lubrication of the mechanical system being used to resupply the lubrication circuit.

A lubrication device of a mechanical system thus includes a main lubrication circuit, a tank containing a lubrication liquid and a flow generator, and potentially a cooling circuit. This tank is for example formed by the lower portion of a casing containing this mechanical system.

A lubrication device may also include a backup lubrication circuit for use in the event of a malfunction resulting for example in a drop or loss of pressure in the lubrication circuit. This pressure drop may be the result of a failure of the flow generator or a leak in the main lubrication circuit or the cooling circuit. Such a backup lubrication circuit then ensures that at least the essential members of the mechanical system are lubricated, enabling this mechanical system to operate, potentially in degraded mode. If this mechanical system is for example a main power gear box of an aircraft, this backup lubrication circuit enables the aircraft to operate until a landing site is reached. Such a backup lubrication circuit thus improves the safety of the aircraft.

The main lubrication circuit and the backup lubrication circuit can use the same tank containing the lubrication liquid.

The backup lubrication circuit can also use a dedicated auxiliary tank that is separate from the main tank used by the main lubrication circuit, as described in document FR 2826094. This auxiliary tank is in this case entirely separate from the main lubrication circuit.

The lubrication liquid is usually returned to the tank under the effect of gravity, without the use of any special means. The lubrication liquid thus flows over the elements of the mechanical system and along the walls of a casing containing this mechanical system so as to be recovered directly by the tank formed for example by the lower portion of this casing.

Furthermore, a mechanical system may have several zones that require significant lubrication. This mechanical system can then be associated with a single casing in order to recover the lubrication liquid coming from these different zones. The use of such a single casing can sometimes cause significant space and mass problems, which may have adverse effects, notably for a mechanical system in an aircraft.

Separating this casing into several casings, each forming a recovery tank for the lubrication liquid coming from these different zones, also causes problems of complexity and operation of the lubrication device of this mechanical system. Indeed, this lubrication device must be able to use the lubrication liquid recovered by each casing in order to resupply the lubrication circuit.

For this purpose, such a lubrication device can for example have as many pumps as casings in order to directly suction the lubrication liquid recovered by each one. This increase in the number of pumps has a number of drawbacks, notably an increase in the mass and in the cost of the lubrication device, as well as an increase in the risk of faults in the lubrication device, thereby tending to reduce the reliability thereof.

This number of pumps can be reduced by using a main tank formed by one of these casings and supplied with lubrication liquid by the other casings, each forming a recovery tank. This lubrication device can then use a single pump for supplying lubrication liquid to the lubrication circuit located only in the main tank with implementation of systems located in the recovery tanks for delivering lubrication liquid to the main tank.

Each delivery system has ducts linking each recovery tank to the main tank. These ducts thus enable the lubrication liquid to be delivered under the effect of gravity from the recovery tanks to the main tank. This gravity-based delivery therefore requires the main tank to be arranged at least partially below the recovery tanks, which may have an impact on installation of the recovery tanks and of the main tanks, and consequently increase the size of the lubrication device.

In order to limit this increase in the size of the lubrication device, the delivery system can then have one or more supplementary recovery pumps to enable the lubrication liquid located in the recovery tanks to be delivered to the main tank, regardless of the position of said tanks. These supplementary recovery pumps therefore act in place of the gravitational effect.

As before, the use of these supplementary recovery pumps results in an increase in mass, in cost and in the risk of failure of the lubrication device.

Furthermore, this delivery system becomes more complex if the inclination of the mechanical system varies during operation. This is notably the case for a mechanical system located on board an aircraft in which the pitching and rolling attitude can vary significantly during flight These variations in attitude of the aircraft result in variations of the inclination of the mechanical system, as well as of the recovery tanks and of the main tank.

Indeed, following these variations in inclination of the recovery tanks and of the main tank, the main tank may no longer be positioned beneath the recovery tanks. Consequently, delivery of the lubrication liquid between the recovery tanks and the main tank under the effect of gravity may be interrupted, resulting in disturbances or even stoppage of lubrication of the mechanical system.

Furthermore, these variations in the inclination of the recovery tanks and of the main tank result in a change of the position of the volume of lubrication liquid in each tank, which may result in a stoppage of the supply of lubrication liquid to the ducts, and consequently the stoppage of the supply to the main tank.

Equally, this change in the position of the volume of lubrication liquid in each tank may cause a stoppage of the supply to the main tank by the supplementary recovery pumps, the suction point of each pump being then outside the volume of lubrication liquid. Furthermore, each pump may also be damaged by cavitation.

Furthermore, lubrication liquid retention zones may appear in the recovery tanks, preventing the lubrication liquid from being delivered to the main tank and consequently from being used by the lubrication device. The lubrication liquid located in these retention zones therefore forms an unused mass. Furthermore, filing-sized particles can get trapped and accumulate in these retention zones.

Solutions to this delivery problem have been applied in the aeronautical domain, and in particular to mechanical gear boxes fitted to convertible tilt-rotor aircraft. These rotors have a dual function, acting as lift rotors and propulsion propellers. The mechanical gear box driving each rotor in rotation is therefore also tilting.

Documents FR 2831938 and FR 2814522 describe the lubrication liquid delivery devices that can be used for the different positions of a tilting mechanical gear box of such convertible aircraft. These delivery devices for example have two pumps allocated respectively to a position of the tilting mechanical gear box and enable the lubrication liquid to be delivered to a tank. Another solution is the use of an Archimedes screw, also referred to as a "worm screw", that is driven in rotation and arranged in a recovery channel in order to supply lubrication liquid to the tank. In these two cases, the delivery device uses mechanical drive means that are at risk of failure and that add significant mass to the aircraft.

Documents DE 4227119 and DE 10237417, which describe lubrication systems that have several tanks and that use a jet pump, also referred to as an "ejector", to deliver a lubrication liquid from an auxiliary tank to a main tank, are also known.

Document DE 4227119 describes a lubrication system for a gear box of an agricultural machine that has a main tank and an auxiliary tank. A pump is used to deliver the oil from the main tank to the gears. A return conduit directs the oil to the additional tank, before flowing through a jet pump to drive the oil contained in this auxiliary tank to the main tank.

Document DE 10237417 describes a lubrication system for a combustion engine. This lubrication system has an oil sump acting as main tank. A zone of the sump retains the oil that cannot flow back to the main tank on its own. This lubrication system has a jet pump positioned in this zone and linked to a return conduit supplied by a main pump in order to deliver the oil located in this zone to the main tank.

Finally, the technological background to the invention notably includes documents US 2014/076661 and DE 10051356, which describe a lubrication system provided with two tanks and a communication device between these two tanks.

Furthermore, the complexity of a lubrication device designed to lubricate several zones of a mechanical system that is subject to variations in inclination can be further accentuated if these lubrication devices have a main lubrication circuit and at least one backup lubrication circuit.

BRIEF SUMMARY OF THE INVENTION

The present invention is therefore intended to propose a lubrication device for a mechanical system that overcomes the limitations mentioned above, and in particular that delivers a lubrication liquid to a main tank from recovery tanks in an optimized and reliable manner, regardless of the inclination of the mechanical system.

The present invention is intended to simplify the delivery system of the lubrication liquid between one or more recovery tanks and a main tank, while minimizing the mass thereof and limiting the risk of malfunction.

According to the invention, a lubrication device that is designed to lubricate a mechanical system has a main tank containing a lubrication liquid, at least one recovery tank, at least one lubrication circuit, at least one flow generator and a delivery system for each recovery tank, each flow generator supplying a lubrication circuit with the lubrication liquid located in the main tank, each delivery system being designed to deliver said lubrication liquid located in a recovery tank to the main tank.

Mechanical systems usually have rotary elements and elements for transmitting power and reducing or increasing rotational speed that need to be lubricated and cooled by a lubrication liquid to work correctly. Such mechanical systems can have several zones that require lubrication, and these zones may be associated respectively with separate casings that form tanks. This lubrication liquid is stored in a main tank and suctioned using a flow generator, for example a pump, in order to supply a lubrication circuit.

This lubrication circuit then allows the lubrication liquid to be distributed, for example by spraying, over the elements of the mechanical system that require lubrication. The lubrication liquid then flows, under the effect of gravity, and is recovered in the main tank or in one or more recovery tanks formed for example respectively by the casings of the mechanical system.

This lubrication device is noteworthy in that each delivery system has an ejector as well as first and second conduits, the ejector being arranged in a recovery tank, the first conduits being linked to the ejector in order to supply the ejector with lubrication liquid located in the main tank, the second conduits being linked to the ejector in order to deliver to the main tank firstly the lubrication liquid flowing in the first conduits and supplying the ejector and secondly the lubrication liquid located in the recovery tank The flow of the primary stream of the lubrication liquid supplying the ejector is generated by a flow generator.

An ejector is a member commonly used in the domain of fluid flows that uses a primary stream of a first fluid to suction a secondary stream of said first fluid or of a second fluid and to generate a flow and/or a pressure in this secondary stream before same is ejected from the ejector.

The primary and secondary streams of these fluids are mixed in this ejector before ejection of same.

An ejector is frequently used to regulate, as required, the flow rate of the fuel flowing through a feed circuit, that is for example used to supply fuel to an aircraft engine member, as described in document U.S. Pat. No. 3,275,061.

In the context of the lubrication device according to the invention, a primary stream of lubrication liquid supplies the ejector by means of first conduits, the flow of the primary stream of lubrication liquid being generated by a flow generator. The ejector is arranged in a recovery tank, preferably at the bottom of this recovery tank, and is therefore usually partially or fully immersed in a volume of lubrication liquid, depending on the volume of recovered lubrication liquid in this recovery tank. A secondary stream of this lubrication liquid located in the secondary tank is then suctioned by the ejector, then forced back with the first flow out of the ejector and directed by second conduits to the main tank.

This ensures that the main tank is supplied firstly with the lubrication liquid flowing directly to this main tank and secondly by the lubrication liquid recovered by each recovery tank. The lubrication device according to the invention thus guarantees a near-constant supply of lubrication liquid to the main tank, and consequently the correct lubrication of the different zones of the mechanical system.

More specifically, an ejector usually has an inlet nozzle of the primary stream, a secondary inlet channel of the secondary stream, a main channel provided with a spigot and an outlet arranged downstream of the spigot. The inlet nozzle communicates with the central channel substantially coaxially while the secondary inlet channel opens out into the main channel substantially perpendicularly, downstream of the inlet nozzle and upstream of the spigot. The flow of the primary stream inside the main channel generates a capture of the secondary stream through the secondary channel by suction. The primary and secondary streams mix in the main channel upstream of the spigot, and are then discharged from the ejector via the outlet. The concepts "upstream" and "downstream" are understood with reference to the direction of flow of these streams through the ejector.

For each delivery system, the first conduits are thus connected to the inlet nozzle of the ejector and the second conduits are linked to the outlet of the ejector, the secondary inlet channel being partially or fully immersed and therefore in contact with the lubrication liquid located in the recovery tank.

Advantageously, an ejector is a passive component that has no moving parts. The risk of failure of this component is therefore very low, and the use thereof on the lubrication device according to the invention does not reduce the reliability of this lubrication device. Furthermore, such an ejector does not need to be associated with a backup component to cover an improbable failure of this ejector.

Furthermore, the use of such an ejector makes it possible to overcome installation constraints affecting the recovery tanks in relation to the main tank. As such, the main tank is not necessarily arranged beneath the recovery tanks, which thus helps to optimize the space occupied by installation of the recovery tanks and the main tank.

According to a preferred embodiment of the invention, the first conduits of the delivery system link the ejector to the lubrication circuit of the lubrication device. The flow of the primary stream of the lubrication liquid supplying the ejector is advantageously generated by the flow generator supplying this lubrication circuit. This embodiment advantageously obviates the need for an additional component and thus helps to optimize the mass of the lubrication device according to the invention.

According to an alternative embodiment of the invention, the lubrication device according to the invention has a supplementary flow generator that suctions the lubrication liquid located in the main tank and is linked to the ejector by means of the first conduits of the delivery system. As such, the flow of the primary stream of the lubrication liquid supplying the ejector is generated by this supplementary flow generator, independently of each lubrication circuit. This alternative embodiment advantageously enables the supply of each lubrication circuit and the supply of this delivery system to be dissociated. In particular, the supplementary flow generator can be optimized, notably in terms of dimensions and mass, as a function of the sole function thereof of delivering the lubrication liquid from a recovery tank to a main tank.

Furthermore, in the context of this alternative embodiment, if the lubrication device has several delivery systems, the supplementary flow generator can be used jointly to supply the ejector of each delivery system.

However, a supplementary flow generator can be associated with each delivery system in order to supply the ejector of this delivery system individually.

The lubrication device according to the invention is particularly suited to the mechanical system with several zones to be lubricated and in which the inclination can vary. Indeed, the variations in inclination of the mechanical system result in variations of the inclination of the recovery tanks and of the main tank. Advantageously, an ejector is not damaged if the secondary inlet channel thereof is not immersed in a liquid, unlike a pump, which is susceptible to cavitation. In this case, delivery of the lubrication liquid located in the recovery tanks to the main tank is stopped temporarily, without damaging the ejector, and delivery of the lubrication liquid can be resumed when the ejector is again immersed, once the inclination is again close to the nominal inclination of the mechanical system or the volume of lubrication liquid is increased.

Furthermore, according to variants applicable to both embodiments of the invention described above, the delivery system may include ducts linking the recovery tanks to the main tank and enabling the lubrication liquid to flow under the effect of gravity from each recovery tank to the main tank.

According to a first variant, these ducts enable the lubrication liquid to flow under the effect of gravity from each recovery tank to the main tank only from a given inclination of the tanks. This first variant for example enables delivery of the lubrication liquid to be maintained when the ejector is not immersed in the lubrication liquid as a result of a given inclination of the tanks. In this case, the main tank need not necessarily be at least partially beneath the recovery tanks, the ducts being operational only when the mechanical system is inclined.

However, each delivery system may have at least one backflow prevention device arranged in each duct that is designed to prevent the inverse delivery of the lubrication liquid from the main tank towards one or more recovery tanks beneath this given inclination.

According to a second variant, these ducts enable the lubrication liquid to flow under the effect of gravity from each recovery tank to the main tank principally in the absence of any inclination of the tanks. In this case, the main tank can be at least partially beneath the recovery tanks. When the mechanical system is not inclined or is barely inclined, this second variant for example enables the lubrication liquid to be delivered from a recovery tank to the main tank firstly under the effect of gravity via the ducts and secondly by the action of the ejector of the delivery system. If the mechanical system is inclined, gravity-based delivery may not work, but this delivery is nonetheless ensured by the ejector.

Each delivery system may also have at least one backflow prevention device arranged in each duct that is designed to prevent the inverse delivery of the lubrication liquid from the main tank towards one or more recovery tanks if the mechanical system is significantly inclined.

Conversely, in the event of a very sharp inclination, this delivery may not be possible, either under the effect of gravity or by means of an ejector. In this case, lubrication can nonetheless be provided by the lubrication liquid located in the main tank. This very sharp inclination is usually only a transitory situation and, once the inclination of the mechanical system is less pronounced, delivery of the lubrication liquid can at least be resumed by the ejector, or under the effect of gravity.

Advantageously, if this sharp inclination lasts for enough time to completely empty the main tank, thereby rendering the ejector of the delivery system inoperative, returning to a lesser inclination enables the lubrication liquid to be delivered to the main tank under the effect of gravity by means of the ducts, thereby making the ejector operative again.

The mechanical system subject to significant variations in inclination are in particular found on aircraft in which the attitude can vary significantly during flight. For example, a mechanical system is a main power gear box of a rotary-wing aircraft.

Indeed, such a main power gear box of an aircraft, which has several zones that require lubrication, may have, depending on the arrangement of the axes of the inlets and outlets thereof, local low points that cause retention zones for the lubrication liquid. Furthermore, the flight attitudes of the aircraft associated with the shape of the casings of the main power gear box may also cause the retention of the lubrication liquid in zones distant from the suction point of the lubrication pumps.

Such a main power gear box thus forms a transmission system of the aircraft having at least two zones with significant lubrication requirements. The lubrication device according to the invention applied to this transmission system thus enables the simultaneous lubrication of these different zones and recovery of the lubrication liquid used, regardless of flight conditions and regardless of the inclination of the aircraft.

The lubrication liquid used for each zone is thus recovered in the casings of the main power gear box, comprising for example a central casing and one or more lateral casings. The central casing of the main power gear box is then the main tank of the lubrication device and each lateral casing is respectively a recovery tank.

Furthermore, in order to ensure the operational maintenance and lubrication capacity of the mechanical system, the lubrication device according to the invention may include a main lubrication circuit and one or more backup lubrication circuits.

In this context, the first conduits of the delivery system can link the ejector to the main lubrication circuit. The lubrication liquid flowing in the main lubrication circuit forms the primary stream of the lubrication liquid supplying the ejector.

Furthermore, depending on the operating mode of the lubrication device, each backup lubrication circuit can operate continuously or only in the event of malfunction of the main lubrication circuit.

Indeed, if at least one backup lubrication circuit is working continuously, the first conduits of the delivery system can link the ejector to one or more backup lubrication circuits. The lubrication liquid flowing in the backup lubrication circuit then forms the primary stream of the lubrication liquid supplying the ejector.

If each backup lubrication circuit is not working continuously, the lubrication device can also include a valve arranged downstream of the flow generator supplying the backup lubrication circuit with lubrication liquid and upstream of this backup lubrication circuit. The first conduits of each delivery system link each ejector to this valve. This valve is designed so that, in a first position of the valve, the flow generator supplying this backup lubrication circuit supplies lubrication liquid only to the first conduits, and consequently each ejector, and, in a second position of the valve, each ejector simultaneously, by means of the first conduits, and this backup lubrication circuit.

Ultimately, regardless of the operating mode of the lubrication device, the first conduits of the delivery system can simultaneously link the ejector to the main lubrication circuit and to one or more backup lubrication circuits. In this case, the ejector remains operational even in the event of malfunction of the main lubrication circuit or of one or more backup lubrication circuits.

It can be seen that each ejector is designed to principally generate a flow of lubrication liquid in order to deliver this lubrication liquid to the main tank. The dimensions of each ejector can therefore be adapted to facilitate this flow generation with no particular constraints on pressure generation.

The present invention therefore also relates to a power transmission system designed for a rotary-wing aircraft. This transmission system is for example formed by a main power gear box and is provided with a lubrication device as described above. A central casing of the main power gear box is the main tank of the lubrication device, and each lateral casing of this main power gear box is respectively a recovery tank.

Advantageously, the lubrication device applied to this transmission system thus makes it possible to lubricate each zone of the main power gear box that requires lubrication, and to recover the lubrication liquid used, regardless of the flight conditions and the attitudes of the aircraft.

Furthermore, the lubrication device may include a main lubrication circuit and one or more backup lubrication circuits so that the mechanical system is lubricated continuously, regardless of any malfunction of any lubrication circuit, and therefore works efficiently throughout the flight of the aircraft.

BRIEF DESCRIPTION OF THE DRAWINGS

The invention and the advantages thereof are explained in greater detail in the following description, with examples given for illustrative purposes and with reference to the attached FIGS. 1 to 4, which show examples of a lubrication device of a mechanical system.

DETAILED DESCRIPTION OF THE INVENTION

Elements shown in several different figures are indicated using the same reference signs.

Figure 1:
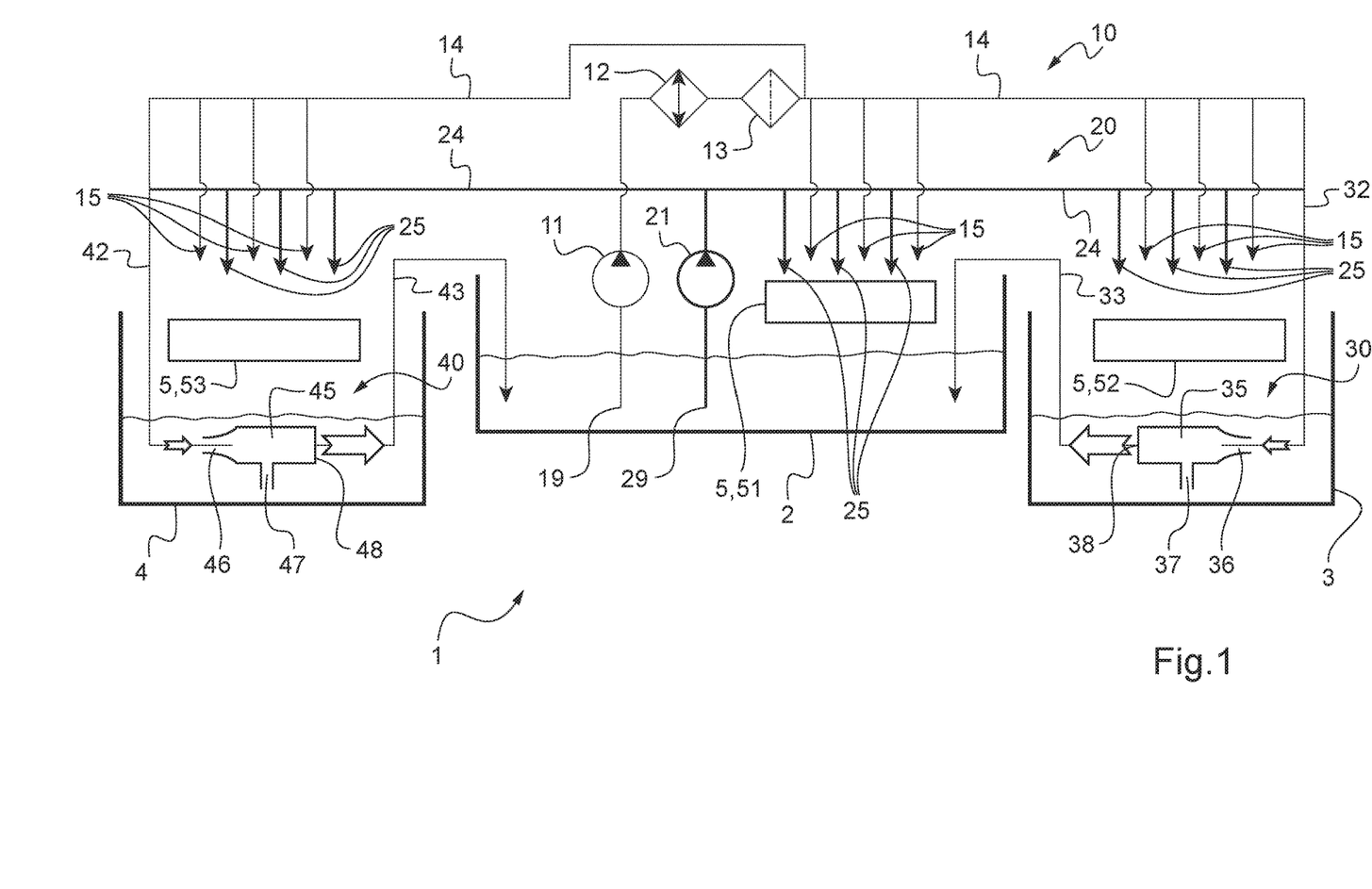
Figure 2:
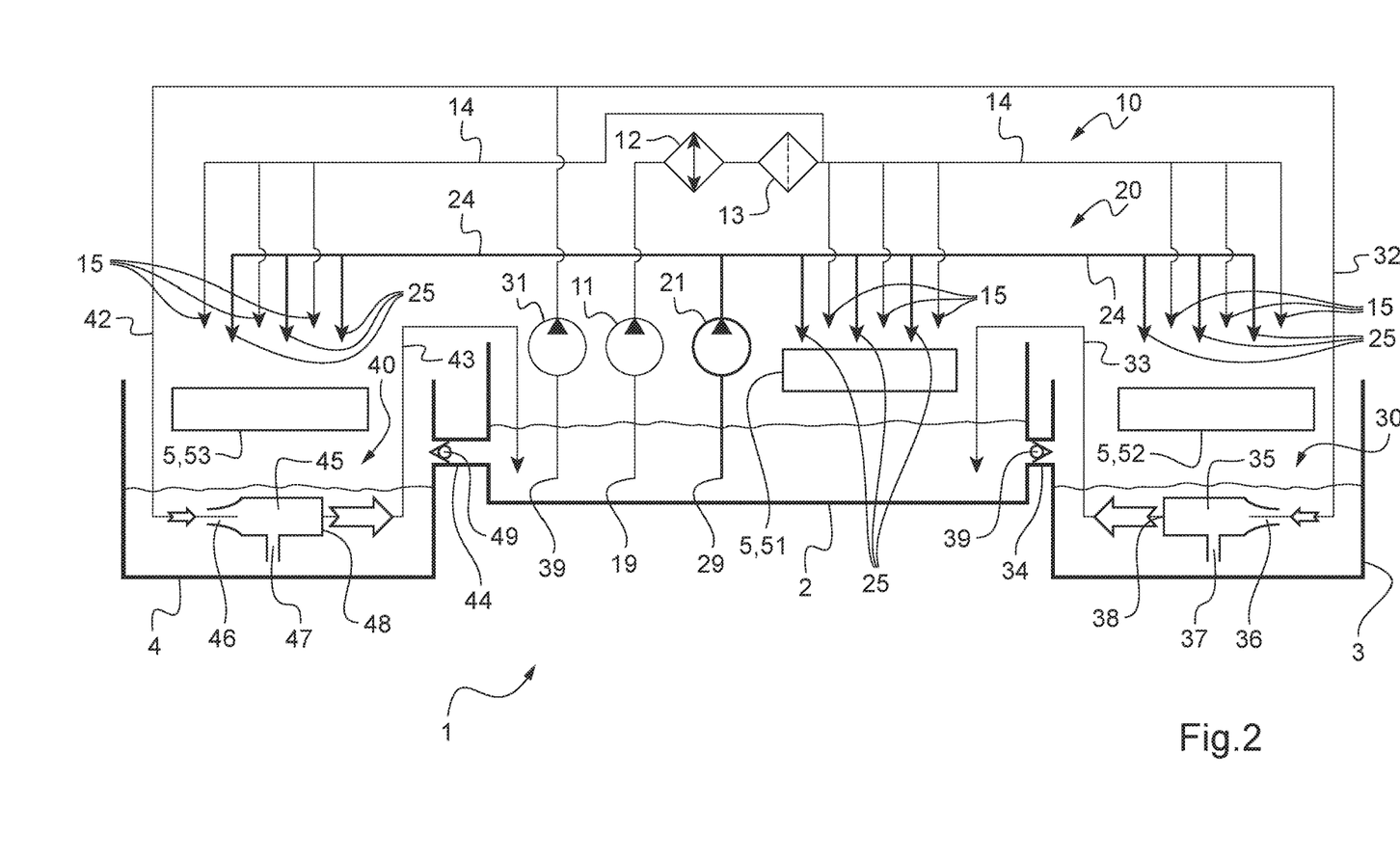
Figure 3:
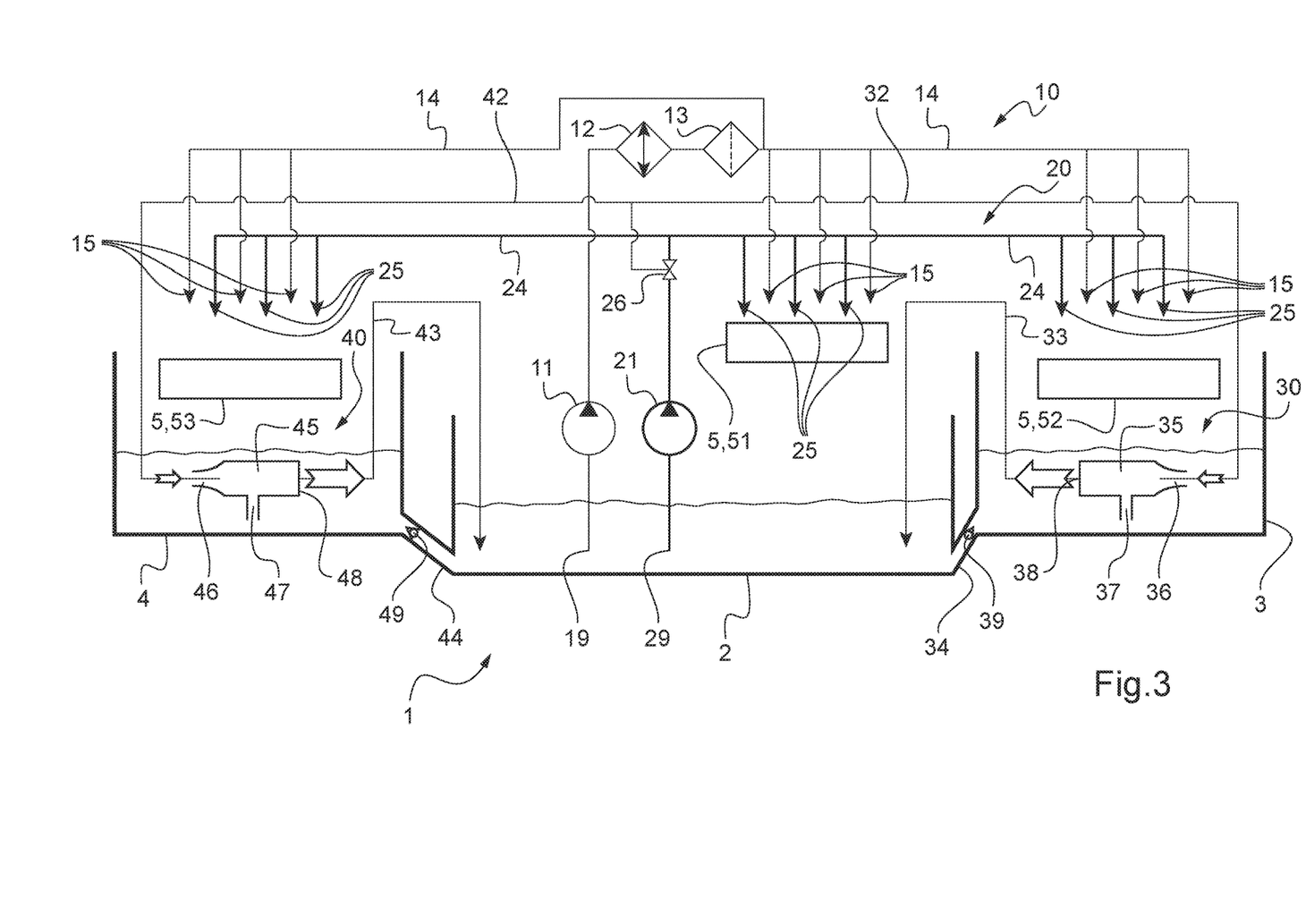

Each lubrication device 1 shown in FIGS. 1 to 4 is intended to lubricate a mechanical system 5 having rotary elements, such as shafts and bearings, and elements for transmitting power and reducing or increasing rotational speed, such as pinions and/or gears. This mechanical system 5 is for example a main power gear box that is fitted to a rotary-wing aircraft and that has three zones 51, 52, 53 that require significant lubrication, as shown in FIGS. 1 to 3.

In order to efficiently lubricate these three zones 51, 52, 53 of the mechanical system 5, the lubrication device 1 includes, in all of the examples shown in FIGS. 1 to 3, a main tank 2 containing a lubrication liquid, two recovery tanks 3, 4, a main lubrication circuit 10, a backup lubrication circuit 20, two flow generators 11, 21 and two delivery systems 30, 40 attached respectively to a recovery tank 3, 4.

The main lubrication circuit 10 has a heat exchanger 12, a filter 13, nozzles 15 and conduits 14 linking these components of the main lubrication circuit 10. The flow generator 11 is referred to as the "main flow generator" and enables the lubrication liquid located in the tank 2 to be drawn via a suction point 19 located in the lower portion of this tank 2 and thus to supply the main lubrication circuit 10 with the lubrication liquid.

The lubrication liquid then passes through the heat exchanger 12 to be cooled, before passing through the filter 13 to reach the nozzles 15 and to be sprayed on to the zones 51, 52, 53 of the mechanical system 5 to be lubricated.

The backup lubrication circuit 20 includes nozzles 25 and conduits 24. The flow generator 21 is referred to as the "backup flow generator" and enables the lubrication liquid located in the tank 2 to be drawn via a suction point 29 located in the lower portion of this tank 2 and thus to supply the backup lubrication circuit 20 with the lubrication liquid.

The lubrication liquid is thus directed towards the nozzles 25 in order to be sprayed on to the zones 51, 52, 53 to be lubricated.

The nozzles 15, 25 are specific and distinct for the main lubrication circuit 10 and the backup lubrication circuit 20, as shown in FIGS. 1 to 4, but may nonetheless be merged and shared by these two lubrication circuits 10, 20.

The main tank 2 is formed by the central casing of the main power gear box. Each lateral casing of this main power gear box forms a recovery tank 3, 4. The main tank 2 is thus arranged beneath the first zone 51 of the main power gear box, and each recovery tank 3, 4 is arranged beneath the second and third zones 52, 53 of this main power gear box respectively. As such, the lubrication liquid used to lubricate the first zone 51 flows into the main tank 2 and the lubrication liquid used to lubricate the second and third zones 52, 53 flows into the recovery tank 3, 4 respectively.

Each delivery system 30, 40 is designed to deliver the lubrication liquid recovered by each recovery tank 3, 4 towards the main tank 2. For this purpose, each delivery system 30, 40 has an ejector 35, 45 arranged in a recovery tank 3, 4, as well as first and second conduits 32, 33, 42, 43.

Each ejector 35, 45 has an inlet nozzle 36, 46, a secondary inlet channel 37, 47 and an outlet 38, 48. The first conduits 32, 42 are linked to the inlet nozzle 36, 46 of the ejector 35, 45 and the second conduits 33, 43 are linked to the output 38, 48 of the ejector 35, 45. Since the ejector 35, 45 is arranged in a recovery tank 3, 4, the secondary inlet channel 37, 47 is in contact with the lubrication liquid located in this recovery tank 3, 4, when the ejector 35, 45 is at least partially immersed in this lubrication liquid.

According to the first example lubrication device 1 shown in FIG. 1, the first conduits 32, 42 of each delivery system 30, 40 link the ejector 35, 45 simultaneously to the main lubrication circuit 10 and to the backup lubrication circuit 20. As such, each ejector 35, 45 is supplied with lubrication liquid by either the main lubrication circuit 10 or the backup lubrication circuit 20, or by both simultaneously if these two lubrication circuits 10, 20 operate simultaneously. Each ejector 35, 45 is thus supplied with the lubrication liquid located in the main tank 2 by means of the main flow generator 11 and/or the backup flow generator 21.

The second conduits 33, 43 linked to the outlet 38, 48 of the ejector 35, 45 enable the lubrication liquid in each recovery tank 3, 4 to be forced back and suctioned by the secondary inlet channel 37, 47, then delivered to the main tank 2. The main tank 2 is thus supplied with the lubrication liquid recovered in each recovery tank 3, 4.

The operation of each of the delivery systems 30, 40 in the two examples shown in FIGS. 2 and 3 is similar to this first example, with only the means for supplying each ejector 35, 45 with lubrication liquid being different.

The lubrication device 1 according to the second example shown in FIG. 2 includes a supplementary flow generator 31 to suction the lubrication liquid located in the main tank 2. The first conduits 32, 42 then link each ejector 35, 45 to this supplementary flow generator 31 in order to supply this ejector 35, 45 with the lubrication liquid located in the main tank 2.

Each delivery system 30, 40 thus works independently of the main lubrication circuit 10 and of the backup lubrication circuit 20.

Furthermore, each delivery system 30, 40 has ducts 34, 44 linking each recovery tank 3, 4 to the main tank 2. These ducts 34, 44 are designed to ensure that the lubrication liquid located in a recovery tank 3, 4 flows under the effect of gravity towards the main tank 2 when the mechanical system 5 is inclined. Indeed, FIG. 2 shows how the main tank 2 is arranged above each recovery tank 3, 4. Consequently, if the mechanical system 5 is not inclined, as shown in FIG. 2, the action of gravity does not enable delivery of the lubrication liquid from each recovery tank 3, 4 to the main tank 2 via the ducts 34, 44.

Conversely, following an inclination of the mechanical system 5, one of the two recovery tanks 3, 4 may be above the main tank 2, thus enabling delivery of the lubrication liquid from this recovery tank 3, 4 to the main tank 2 via the ducts 34, 44. This delivery may be supplementary to operation of the ejector 35, 45 of each delivery system 30, 40 or cover the non-operation of this ejector 35, 45 if same comes out of the lubrication liquid, for example.

Furthermore, each delivery system 30, 40 has a backflow prevention device 39, 49, for example a check valve, arranged in each duct 39, 49 to prevent the action of gravity causing an inverse delivery from the main tank 2 towards each recovery tank 3, 4.

In the third embodiment shown in FIG. 3, the lubrication device 1 includes a valve 26 arranged downstream of the backup flow generator 21 and upstream of the backup lubrication circuit 20. The first conduits 32, 42 of each delivery system 30, 40 link each ejector 35, 45 to this valve 26. As such, each ejector 35 is supplied with lubrication liquid only by the backup flow generator 21 supplying the backup lubrication circuit 20. Each delivery system 30, 40 thus works independently of the main lubrication circuit 10.

The valve 26 has at least two positions. In a first position, the valve 26 enables the backup flow generator 21 to supply the lubrication liquid located in the main tank 2 only to the first conduits 32, 42 of each delivery system 30, 40, and consequently each ejector 35, 45. In this first position, the backup lubrication circuit 20 is not supplied with lubrication liquid. This first position of the valve 26 thus enables delivery, via each ejector 35, 45, of the lubrication liquid located in each recovery tank 3, 4 to the main tank 2 without supplying lubrication liquid to the backup lubrication circuit 20.

In a second position, the valve 26 enables the backup flow generator 21 to supply the lubrication liquid located in the main tank 2 to the first conduits 32, 42 of each delivery system 30, 40 and the backup lubrication circuit 20 simultaneously.

Furthermore, each delivery system 30, 40 has ducts 34, 44 linking each recovery tank 3, 4 to the main tank 2. These ducts 34, 44 are designed to enable the lubrication liquid located in a recovery tank 3, 4 to flow under the effect of gravity to the main tank 2 when the mechanical system is not inclined or is barely inclined, the main tank 2 being positioned vertically lower than the recovery tanks 3, 4, as shown in FIG. 3. This delivery then supplements operation of the ejector 35, 45 of each delivery system 30, 40.

When the mechanical system 5 is inclined, the main tank 2 may be at the same level as or above a recovery tank 3, 4. In this case, the action of gravity no longer enables the lubrication liquid to be delivered from this recovery tank 3, 4 to the main tank 2 via the ducts 34, 44. Advantageously, the ejector 35, 45 enables this delivery and guarantees that the main tank 2 is always supplied using the lubrication liquid located in at least one recovery tank 3, 4.

Furthermore, as in the second example, each delivery system 30, 40 has one backflow prevention device 39, 49 arranged in each duct 39, 49 to prevent the inverse delivery of the lubrication liquid located in the main tank 2 towards each recovery tank.

Figure 4:
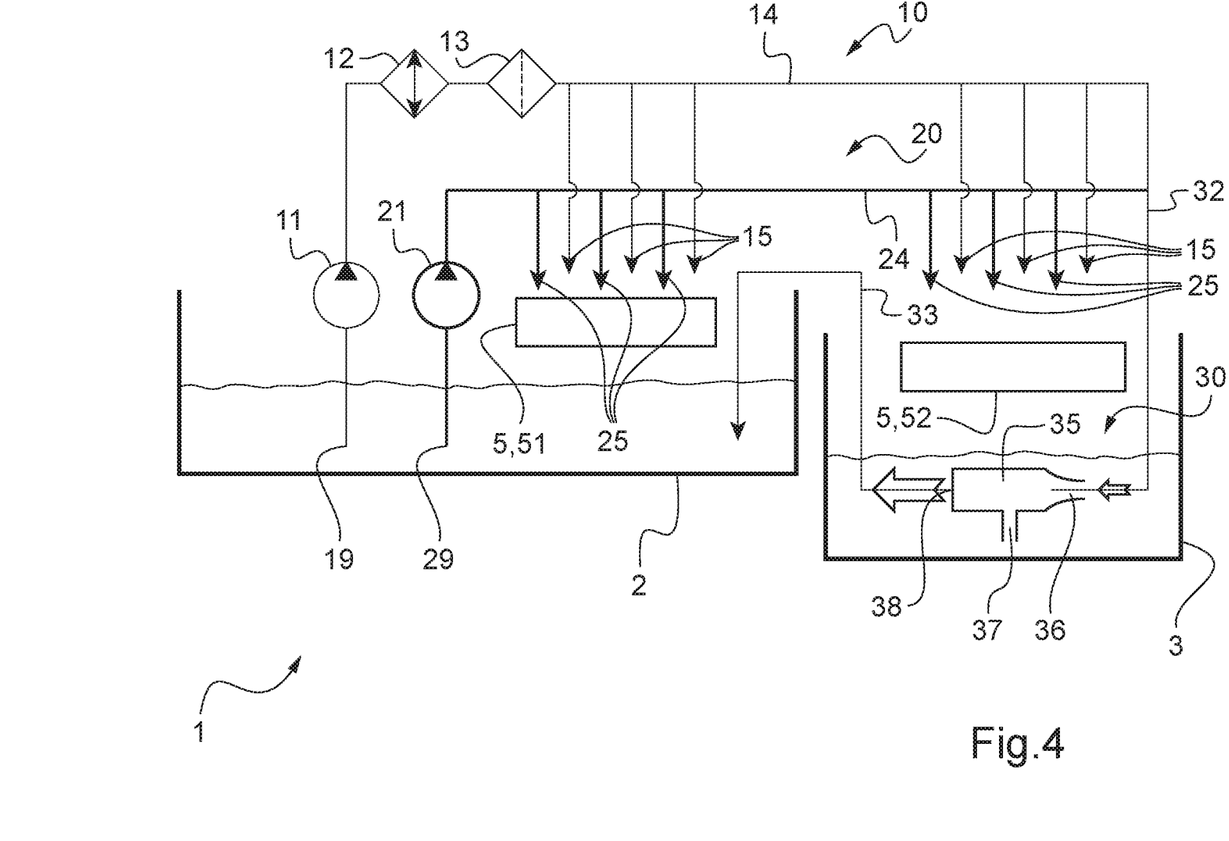

Furthermore, the lubrication device 1 can also use a single recovery tank 3, as shown in FIG. 4. According to this fourth example lubrication device 1, the mechanical system 5 is for example a main power gear box that is fitted to a rotary-wing aircraft and that has two zones 51, 52 to be lubricated. The main tank 2 is then formed by the central casing of the main power gear box and the recovery tank 3 is formed by a lateral casing of this main power gear box.

Operation of this lubrication device 1 is similar to the first example shown in FIG. 1, the first conduits 32 of the delivery system 30 link the ejector 35 simultaneously to the main lubrication circuit 10 and to the backup lubrication circuit 20. As such, the ejector 35 is supplied with lubrication liquid by either the main lubrication circuit 10 or the backup lubrication circuit 20, or by both simultaneously. The ejector 35 is thus supplied with the lubrication liquid located in the main tank 2 by means of the main flow generator 11 and/or the backup flow generator 21.

The second conduits 33 linked to the outlet 38 of the ejector 35 enable the lubrication liquid in each recovery tank 3 to be forced back, then delivered to the main tank 2.

Naturally, numerous implementation variations can be applied to the present invention. Although several embodiments have been described, it is understandably impossible to identify all possible embodiments exhaustively. It is clearly possible to replace any of the means described with equivalent means without thereby moving outside the scope of the invention.

What is claimed is:

1. A lubrication device of a mechanical system, the lubrication device having a main tank containing a lubrication liquid, at least one recovery tank, a main lubrication circuit and a backup lubrication circuit, a main flow generator for the main lubrication circuit and a backup flow generator for the backup lubrication circuit and a delivery system for each recovery tank, the main flow generator supplying the main lubrication circuit with the lubrication liquid located in the main tank and the backup flow generator supplying the backup lubrication circuit with the lubrication liquid located in the main tank, each delivery system being designed to deliver the lubrication liquid located in the recovery tank to the main tank, each delivery system having an ejector as well as a first conduit and a second conduit, the ejector being arranged in the recovery tank, the first conduit being linked to the ejector in order to supply the ejector with lubrication liquid located in the main tank, the second conduit being linked to the ejector in order to deliver to the main tank firstly the lubrication liquid flowing in the first conduit and secondly the lubrication liquid located in the recovery tank, the first conduit capable of linking the ejector either to the main lubrication circuit, to the backup lubrication circuit, and simultaneously to the main lubrication circuit and to the backup lubrication circuit.

2. The lubrication device as claimed in claim 1,
wherein the ejector is provided with an inlet nozzle of a primary stream of the lubrication liquid, a secondary inlet channel of a secondary stream of the lubrication liquid and an outlet, the first conduit being linked to the inlet nozzle of the ejector, the second conduit being linked to the outlet of the ejector, the secondary inlet channel being in contact with the lubrication liquid located in the recovery tank.

3. The lubrication device as claimed in claim 2,
wherein the ejector is principally designed to generate a flow of lubrication liquid at the outlet in order to deliver the lubrication liquid located in the recovery tank to the main tank.

4. The lubrication device as claimed in claim 1,
wherein the lubrication device has a valve arranged downstream of the backup flow generator supplying at least one backup lubrication circuit with lubrication liquid and upstream of at least one backup lubrication circuit, the valve being designed to supply lubrication liquid to the first conduit and consequently to each ejector in a first position of the valve, and to the first conduit and the at least one backup lubrication circuit simultaneously in a second position of the valve.

5. The lubrication device as claimed in claim 1,
wherein the delivery system has ducts linking the recovery tank to the main tank, the ducts being designed such that the lubrication liquid located in a recovery tank flows under the effect of gravity towards the main tank.

6. The lubrication device as claimed in claim 5,
wherein the delivery system has at least one backflow prevention device arranged in the ducts that is designed to prevent the inverse delivery of the lubrication liquid from the main tank towards one or more recovery tanks.

7. The lubrication device as claimed in claim 1,
wherein the mechanical system is a power transmission system of an aircraft.

8. A power transmission system designed for an aircraft that includes a main power gear box having at least two zones with significant lubrication requirements,
wherein the power transmission system is provided with a lubrication device as claimed in claim 7, a central casing of the main power gear box forming the main tank and each lateral casing of the main power gear box forming one recovery tank respectively.

9. A lubrication device of a mechanical system, the lubrication device having a main tank containing a lubrication liquid, a recovery tank, a main lubrication circuit and a backup lubrication circuit, a main flow generator for the main lubrication circuit and a backup flow generator for the backup lubrication circuit and a delivery system for the recovery tank, the main flow generator supplying the main lubrication circuit with lubrication liquid located in the main tank and the backup flow generator supplying the backup lubrication circuit with lubrication liquid located in the main tank, the delivery system delivering lubrication liquid located in the recovery tank to the main tank, the delivery system having an ejector, a first conduit and a second conduit, the ejector disposed in the recovery tank, the first conduit linked to the ejector to supply the ejector with lubrication liquid located in the main tank, the second conduit linked to the ejector to deliver to the main tank the lubrication liquid flowing in the first conduit and the lubrication liquid located in the recovery tank, the first conduit linking the ejector to the main lubrication circuit and to the backup lubrication circuit.

10. The lubrication device as claimed in claim 9, wherein the ejector is provided with an inlet nozzle of a primary stream of the lubrication liquid, a secondary inlet channel of a secondary stream of the lubrication liquid and an outlet, the first conduit linked to the inlet nozzle of the ejector, the second conduit linked to the outlet of the ejector, the secondary inlet channel in contact with the lubrication liquid located in the recovery tank.

11. The lubrication device as claimed in claim 10, wherein the ejector generates a flow of lubrication liquid at the outlet in order to deliver the lubrication liquid located in the recovery tank to the main tank.

12. The lubrication device as claimed in claim 9, wherein the mechanical system is a power transmission system of an aircraft.

13. A power transmission system designed for an aircraft that includes a main power gear box having at least two zones with lubrication requirements, wherein the power transmission system is provided with the lubrication device as claimed in claim 12, a central casing of the main power gear box forming the main tank and each lateral casing of the main power gear box forming one recovery tank respectively.

14. A lubrication device of a mechanical system, the lubrication device comprising:

a main tank containing a lubrication liquid;
a first recovery tank;
a main lubrication circuit having a main flow generator, the main lubrication circuit in communication with the main tank for supplying the main lubrication circuit with lubrication liquid located in the main tank;
a backup lubrication circuit having a backup flow generator, the backup lubrication circuit in communication with the main tank for supplying the backup lubrication circuit with lubrication liquid located in the main tank; and a first delivery system for the first recovery tank, the first delivery system in communication with the main tank and the first recovery tank for delivering lubrication liquid located in the first recovery tank to the main tank, the first delivery system having a first ejector, a first conduit and a second conduit, the first ejector disposed in the first recovery tank, the first conduit in communication with the first ejector to supply the first ejector with lubrication liquid located in the main tank, the second conduit in communication with the first ejector and the main tank to supply the main tank with lubrication liquid located in the first recovery tank, the first conduit in communication with the first ejector, the main lubrication circuit and the backup lubrication circuit.

15. The lubrication device as claimed in claim 14, wherein the first ejector is provided with an inlet nozzle of a primary stream of the lubrication liquid, a secondary inlet channel of a secondary stream of the lubrication liquid and an outlet, the first conduit being linked to the inlet nozzle of the first ejector, the second conduit being linked to the outlet of the first ejector, the secondary inlet channel being in contact with the lubrication liquid located in the first recovery tank.

16. The lubrication device as claimed in claim 15, wherein the first ejector generates a flow of lubrication liquid at the outlet in order to deliver the lubrication liquid located in the first recovery tank to the main tank.

17. The lubrication device as claimed in claim 14, wherein the mechanical system is a power transmission system of an aircraft.

18. The lubrication device as claimed in claim 14, further comprising:

a secondary recovery tank; and
a second delivery system for the second recovery tank, the second delivery system in communication with the main tank and the second recovery tank for delivering lubrication liquid located in the second recovery tank to the main tank, the second delivery system having a second ejector, a third conduit and a fourth conduit, the second ejector disposed in the second recovery tank, the third conduit in communication with the second ejector to supply the second ejector with lubrication liquid located in the main tank, the fourth conduit in communication with the second ejector and the main tank to supply the main tank with lubrication liquid located in the second recovery tank, the third conduit in communication with the second ejector, the main lubrication circuit and the backup lubrication circuit.

19. A power transmission system designed for an aircraft that includes a main power gear box having at least two zones with significant lubrication requirements, wherein the power transmission system is provided with a lubrication device as claimed in claim 18, a central casing of the main power gear box forming the main tank and each lateral casing of the main power gear box forming one of the first and second recovery tanks respectively.

* * * * *